US012632036B2

(12) United States Patent
Drigalski et al.

(10) Patent No.: US 12,632,036 B2
(45) Date of Patent: May 19, 2026

(54) GENERATION DEVICE, GENERATION METHOD, AND NON-TRANSITORY RECORDING MEDIUM STORED WITH GENERATION PROGRAM

(71) Applicant: OMRON Corporation, Kyoto (JP)

(72) Inventors: Felix von Drigalski, Tokyo (JP); Kazumi Kasaura, Tokyo (JP); Cristian C. Beltran Hernandez, Tokyo (JP); Masashi Hamaya, Tokyo (JP); Kazutoshi Tanaka, Tokyo (JP)

(73) Assignee: OMRON Corporation, Kyoto (JP)

( * ) Notice: Subject to any disclaimer, the term of this patent is extended or adjusted under 35 U.S.C. 154(b) by 90 days.

(21) Appl. No.: 18/437,827

(22) Filed: Feb. 9, 2024

(65) Prior Publication Data

US 2024/0280965 A1      Aug. 22, 2024

(30) Foreign Application Priority Data

Feb. 21, 2023    (JP) ................................. 2023-025473

(51) Int. Cl.
G05B 19/41        (2006.01)
B25J 9/16          (2006.01)
G05B 19/4155      (2006.01)

(52) U.S. Cl.
CPC ........ G05B 19/4155 (2013.01); B25J 9/1664 (2013.01); *G05B 2219/39466* (2013.01)

(58) Field of Classification Search
CPC ....... G05B 19/4155; G05B 2219/39466; B25J 9/1664; B25J 9/1612

USPC ......................................................... 700/245
See application file for complete search history.

(56) References Cited

U.S. PATENT DOCUMENTS

| | | | | |
|---|---|---|---|---|
| 9,975,242 | B1 * | 5/2018 | Stubbs ................... | B25J 9/1612 |
| 2017/0326728 | A1 * | 11/2017 | Prats .................... | H04N 13/204 |
| 2020/0316782 | A1 * | 10/2020 | Chavez .................. | B25J 9/1697 |
| 2022/0072707 | A1 * | 3/2022 | Fan .......................... | B25J 9/1605 |
| 2023/0286152 | A1 * | 9/2023 | Biwaki ................. | B25J 9/1664 |
| 2024/0017940 | A1 * | 1/2024 | Lovett ................... | B65G 61/00 |

FOREIGN PATENT DOCUMENTS

| | | |
|---|---|---|
| JP | 2015-000455 A | 1/2015 |
| WO | 2021/048598 A | 3/2021 |

OTHER PUBLICATIONS

Barfoot et al., "Associating Uncertainty With Three-Dimensional Poses for Use in Estimation Problems", IEEE Transactions on Robotics, vol. 30, No. 3, Jun. 2014, pp. 679-693.

(Continued)

*Primary Examiner* — Kira Nguyen
(74) *Attorney, Agent, or Firm* — Morgan, Lewis & Bockius LLP

(57) ABSTRACT

A generation device that includes: a memory, and a processor coupled to the memory, the processor being configured to generate an action series for performing positioning on a target object, the action series including two or more combinations of at least one of a first action of grasping the target object using a gripper of a robot, a second action of placing the target object grasped by the gripper on a support surface, or a third action of pushing the target object with the gripper.

9 Claims, 9 Drawing Sheets

(56) References Cited

OTHER PUBLICATIONS

Drigalski et al., "Uncertainty-Aware Manipulation Planning Using Gravity and Environment Geometry", IEEE Robotics and Automation Letters, vol. 7, No. 4, Oct. 2022, pp. 11942-11949.

Drigalski et al., https: //www.youtube.com/watch?v=Xzz_zt5BgAE", Oct. 14, 2022.".

Drigalski et al., "https://github.com/omron-sinicx/uncertainty-aware-manipulation-planning", Oct. 21, 2022.

Drigalski et al., "https://events.infovaya.com/presentation?id=84598" Oct. 24, 2022.

Drigalski et al., "https://ieeexplore.ieee.org/abstract/document/9894673/", Sep. 19, 2022.

Grace Period Inventor-Originated Disclosure Exception for corresponding Japanese Application No. JP2023-025473 dated Mar. 14, 2023, 39 pages.

* cited by examiner

Glasp#1          Glasp#2

GENERATION DEVICE, GENERATION METHOD, AND NON-TRANSITORY RECORDING MEDIUM STORED WITH GENERATION PROGRAM

CROSS-REFERENCE TO RELATED APPLICATION

This application is based on and claims priority under 35 USC 119 from Japanese Patent Application No. 2023-025473 filed on Feb. 21, 2023, the disclosure of which is incorporated by reference herein.

BACKGROUND

Technical Field

The present disclosure relates to a generation device, generation method, and non-transitory recording medium stored with generation program.

Related Art

Robot related technology is proposed for a robot including a gripper. In this technology the robot performs tasks such as grasping a target object using the gripper, assembling a target object, and the like.

For example Japanese Patent Application Laid-Open (JP-A) No. 2015-000455 discloses a robot device that, for a portion of task sites out of plural task sites of a workpiece, performs a task of positioning the portion of task sites by moving an end effector based on measurement values obtained by sensors. The robot device sets the position pose of the positioned end effector as a reference position pose. This robot device also computes an offset quantity from the reference position pose to the next task site for any remaining task sites from out of the plural task sites not included in the task site portion. The robot device also performs a task to position the remaining task sites by moving the end effector to a position pose shifted by the offset quantity from the reference position pose.

International Publication (WO) No. 2021/048598A1 discloses a method including, in an environment, a step of moving a hand of a robot that is holding an object, and a step of, at a specific point in time, estimating a pose of the hand of the robot holding the object based on earlier interactive information.

However, in an assembly task performed by a robot, there is a demand to position a pose (posture) of a target object with good accuracy in order to grasp appropriate locations on the target object with a gripper provided to the robot and to perform the task with good accuracy.

However, the technologies of JP-A No. 2015-000455 and WO 2021/048598A1 place limitations on the shape of the target object, and are sometimes not able to position the pose of diverse target objects with good accuracy.

SUMMARY

An aspect of the present disclosure is a generation device, that includes: a memory, and a processor coupled to the memory, the processor being configured to generate an action series for performing positioning on a target object, the action series including two or more combinations of at least one of a first action of grasping the target object using a gripper of a robot, a second action of placing the target object grasped by the gripper on a support surface, or a third action of pushing the target object with the gripper.

BRIEF DESCRIPTION OF THE DRAWINGS

Exemplary embodiments of the present disclosure will be described in detail based on the following figures, wherein.

DETAILED DESCRIPTION

Figure 1:
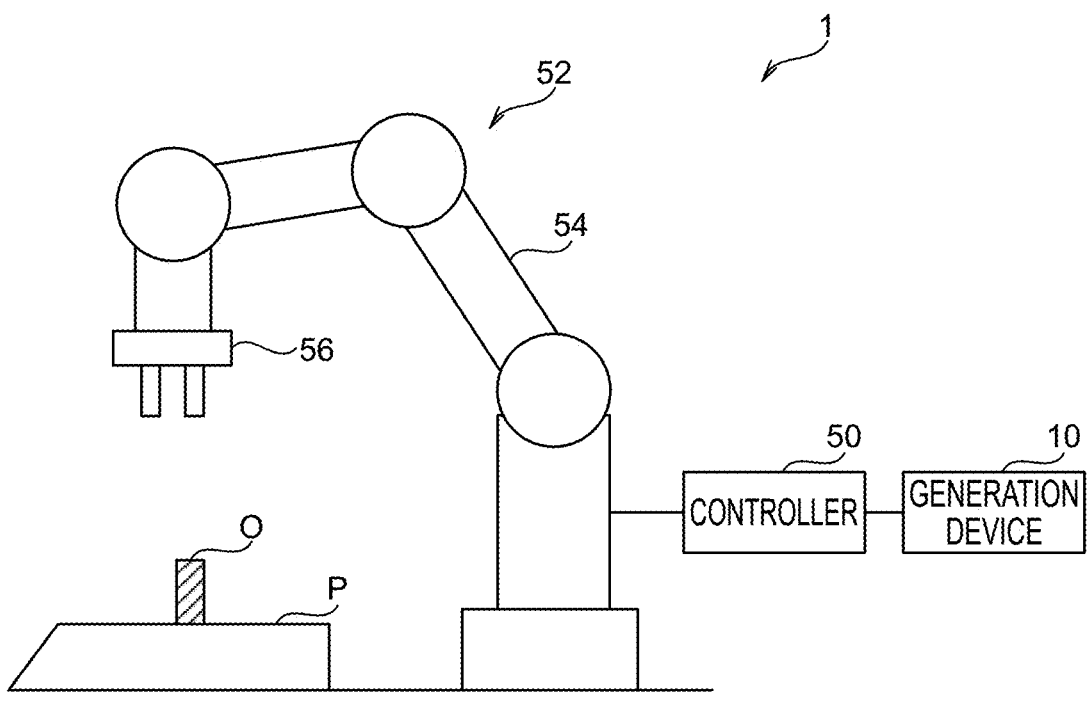
FIG. 1 is a block diagram illustrating a schematic configuration of a robot system.

Description follows regarding an example of exemplary embodiments of the present disclosure, with reference to the drawings. Note that the same reference numerals will be appended in the drawings to configuration elements and parts that are the same or equivalent. Moreover, dimensions and proportions may be exaggerated in the drawings for ease of explanation, and sometimes differ from actual proportions.

First explanation follows regarding a configuration of a robot system 1 according to an exemplary embodiment, with reference to FIG. 1. As illustrated in FIG. 1, the robot system 1 includes a generation device 10, a controller 50, and a robot 52. A computer may be given as an example of a generation device 10 and a controller 50. The generation device 10 and the controller 50 may be implemented by a single computer.

The robot 52 includes a robot arm 54 and a gripper 56. The robot arm 54 is configured including links, and joints that connect between the links and that also rotate or perform a linear motion extension or contraction under drive from motors. The robot arm 54 is driven by the motors according to command values output from the controller 50, and the rotation angle or the extension/contraction state of the joints is changed thereby. The gripper 56 is accordingly controlled so as to be able to adopt a specified position and specified pose (posture) in three-dimensional space.

The gripper 56 is provided to a distal end of the robot arm 54, and is a tool capable of grasping a target object O positioned on a support surface P. The gripper 56 is provided with two flat plate-shaped fingers, enabling the target object O to be grasped by the two fingers. The gripper 56 is also able to push the target object O on the support surface P in a horizontal direction. Note although in the present exemplary embodiment explanation will be given of a case in which the gripper 56 includes two fingers, the gripper 56 may be provided with three or more fingers.

The controller 50 generates command values based on an action series input from the generation device 10, and outputs the command values to the robot 52.

Figure 2:
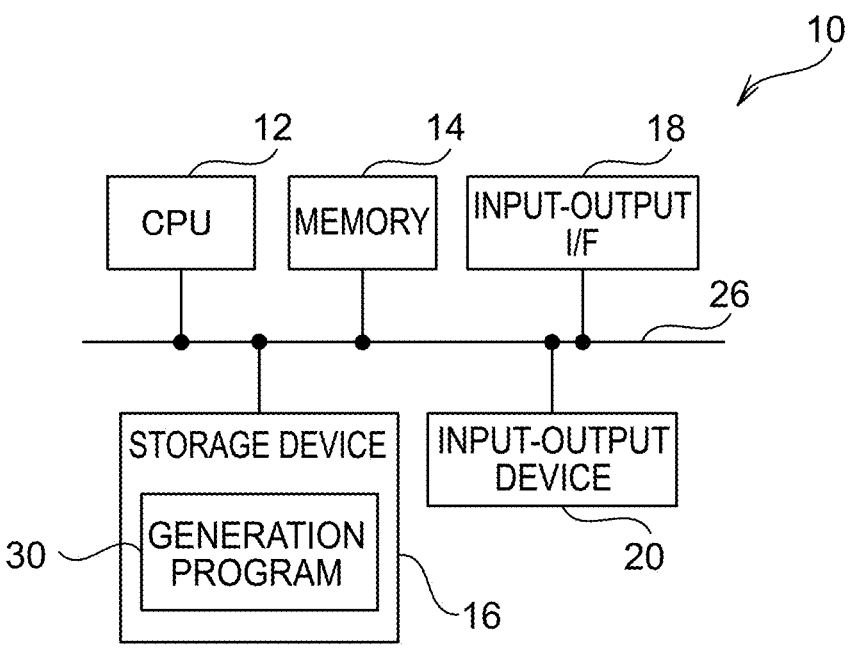
FIG. 2 is a block diagram illustrating an example of a hardware configuration of a generation device.

Next, description follows regarding a hardware configuration of the generation device 10 according to the present exemplary embodiment, with reference to FIG. 2. As illustrated in FIG. 2, the generation device 10 includes a central processing unit (CPU) 12, memory 14, a storage device 16, an input-output interface (I/F) 18, and an input-output device 20. Each configuration is connected so as to be able to mutually communicate through a bus 26.

A generation program 30 is stored on the storage device 16. The CPU 12 is an example of a hardware processor for executing various programs and controlling each configuration. Namely, the CPU 12 loads a program from the storage device 16 and executes the program using the memory 14 as workspace. The CPU 12 controls each of the above configuration and performs various computational processing according to the program stored on the storage device 16.

The memory 14 is configured by random access memory (RAM) and serves as workspace for temporarily storing programs and data. The storage device 16 is configured by a read only memory (ROM), and a hard disk drive (HDD), solid state drive (SSD), or the like, and stores various programs including an operating system and various data.

The input-output I/F 18 is an interface for connecting to the controller 50. The input-output device 20 is, for example, an input device such as a keyboard, mouse, or the like to perform various input, and an output device such as a display, or the like for performing output of various information. By adopting a touch panel display as the output device, this may also function as an input device.

In the present exemplary embodiment, as an example of an assembly task performed by the robot 52, explanation follows regarding a task in which a target object O such as a plate is placed on a support surface P of a tray, and the target object O is fixed on a base such that a position of a screw hole is aligned. Note that three dimensional data of the target object O, a height of the support surface P, and a position of the base are already known.

For tasks performed by such a robot 52, in order to fix the target object O at a goal position with good accuracy, preferably the pose of the target object O is estimated with good accuracy prior to performing the task. The generation device 10 according to the present exemplary embodiment includes a function to generate an action series to perform positioning of the target object O prior to the robot 52 performing a task.

Figure 3:
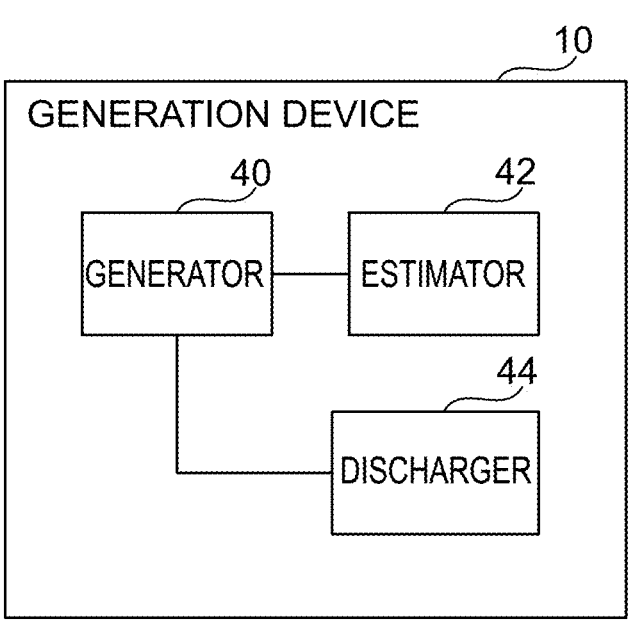
FIG. 3 is a block diagram illustrating an example of a functional configuration of a generation device.

Next, description follows regarding a functional configuration of the generation device 10, with reference to FIG. 3. As illustrated in FIG. 3, the generation device 10 includes a generator 40, an estimator 42, and a discharger 44. The CPU 12 functions as the generator 40, the estimator 42, and the discharger 44 by executing the generation program 30.

The generator 40 generates an action series to perform positioning of the target object O. The action series includes two or more combinations of at least one action from out of a first action, a second action, or a third action. The generator 40 generates an action series in which uncertainty of pose is reduced as each action included in a candidate of the action series is sequentially performed.

The first action is an action to grasp the target object O using the gripper 56 of the robot 52, the second action is an action to place the target object O grasped by the gripper 56 on a support surface P. The third action is an action to push the target object O using the gripper 56. In the following, the first action (namely a Grasp Action) is sometimes abbreviated to Grasp, the second action (namely a Place Action) is sometimes abbreviated to Place, and the third action (namely a Push Action) is sometimes abbreviated to Push.

More specifically, first the generator 40 generates plural different candidates for the action series. The present exemplary embodiment will be described for an example in which the number of candidates for the action series is 30, and the number of actions contained in a single action series is three. The number of candidates for the action series and the number of actions contained in a single action series are not limited to the numbers of this example, and may be set according to accuracy demanded, according to an acceptable value for processing time, or the like.

For a case in which the number of candidates for a conductible action series is N, and the number of actions contained in a single action series is d, the size of the search space for the generator 40 is $O(N^d)$, which is a sufficiently small value. This means that the generator 40 is able to generate candidate action series to reduce the uncertainty of pose by performing a breadth-first search. The generator 40 selects the next action at each step. Both a pose of the target object O after an action and the uncertainty of the pose are each estimated by the estimator 42, described later, on the assumption that the selected action has been performed. Note that in the present exemplary embodiment an estimated value of a start pose of the target object and uncertainty of pose are roughly estimated based on output from visual sensors and on the accuracy of the visual sensors.

An action series includes pairs of an action from out of three actions and an action condition of the actions. The action condition, for example, corresponds to positions or the like on the target object O to be grasped by the gripper 56 when the action is Grasp, corresponds to positions or the like on the support surface P where the target object is to be placed when the action is Place, and corresponds to positions or the like on the target object O to be grasped by the gripper 56 when the action is Push.

Figure 4:
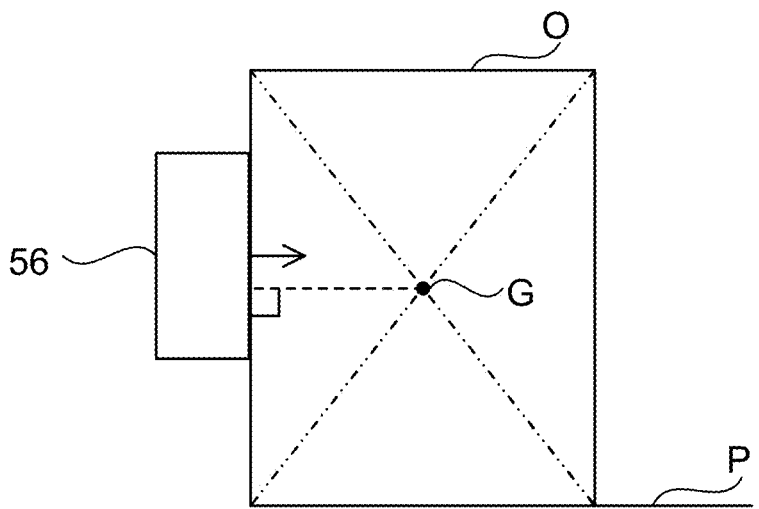
FIG. 4 is a diagram to explain a condition of an action of a gripper pushing a target object.

In the present exemplary embodiment, as illustrated in FIG. 4, a condition in Push is that a perpendicular line drawn from a center of gravity G of the target object O so as to be perpendicular to a line segment or plane connecting two or more points where the gripper 56 contacts the target object O is positioned inside the line segment or inside the plane. Adopting such an approach enables the target object O to be suppressed from falling over due to the target object O being pushed by the gripper 56, and as a result thereof, enables the uncertainty of pose of the target object O to be suppressed from rising.

Figure 5:
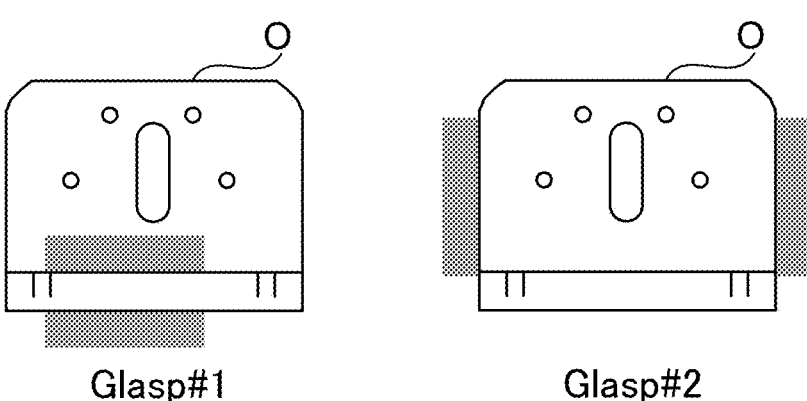
FIG. 5 is a diagram to explain setting different conditions of an action for a gripper to grasp a target object.

Moreover, in cases in which two or more instances of a same action are included in a single action series, the generator 40 is configured so as to set different action conditions between instances of the same action. Explanation follows regarding an example as illustrated in FIG. 5 in which the target object O is a plate having an L-shape in side view, and in which Grasp is occurs two times within a single action series. In the example of FIG. 5, the gray-filled rectangles represent fingers of the gripper 56. In this case the generator 40 controls such that in a first instance of Grasp the gripper 56 grasps the target object O with fingers in a horizontal state, and in a second Grasp the gripper 56 grasps the target object O with fingers in a vertical state. This thereby enables the uncertainty of pose to be reduced by setting different positions for the gripper 56 to grasp the target object O.

The generator 40 generates an action series by selecting an action series from out of plural different candidate action series generated so as to minimize a final value of a score representing the uncertainty of pose.

The estimator 42 estimates the pose of the target object O and the uncertainty of pose thereof after each action assuming that each action contained in the candidate action series has been performed. In the present exemplary embodiment the estimator 42 computes the score expressing the uncertainty of pose. Detailed explanation follows regarding the processing of the estimator 42.

In the present exemplary embodiment a method described in the following Reference Document 1 is employed to model a confidence of the pose of the target object O. As illustrated in following Equation (1), a pose $T \in SO(3)$ having uncertainty is represented as a mean pose $\bar{T} \in SO(3)$ having a small perturbation by a random variable $\xi \in R^6$. The notation T⁻ indicates that there is a bar over T as illustrated in the right hand term of Equation (1).

Reference Document 1: "Associating uncertainty with three-dimensional poses for use in estimation problems" by D. Barfoot and P. T. Furgale in IEEE Transactions on Robotics, vol. 30, no. 3, pp. 679-693, 2014.

Equation (1)

$$T = \exp(\xi^\wedge)\bar{T} \tag{1}$$

where $\wedge : R^6 \rightarrow se(3)$ is defined by $$\xi = \begin{pmatrix} x_1 \\ x_2 \\ x_3 \\ x_4 \\ x_5 \\ x_6 \end{pmatrix} \mapsto \begin{pmatrix} 0 & -x_6 & x_5 & x_1 \\ x_6 & 0 & -x_4 & x_2 \\ -x_5 & x_4 & 0 & x_3 \\ 0 & 0 & 0 & 0 \end{pmatrix}$$

Let $\vee : se(3) \rightarrow R^6$ be the inverse of $\wedge$.

Variable $\xi$ is assumed to be a zero-mean Gaussian distribution $N(0, \Sigma)$, wherein $\Sigma$ is a covariance matrix. This means that pose confidence is expressed using the mean pose T⁻ of the perturbation variable and the covariance matrix $\Sigma$.

The effect that each action imparts to pose confidence is computed in the following manner. First particles are generated with poses $T_1, \ldots, T_N$ according to Equation (1) (wherein N is the number of particles). The poses $T_1, \ldots, T_N$ after each action are then estimated by a computation method described later. Finally, a new pose confidence (T⁻', $\Sigma$') is estimated as a distribution conforming to samples $T'_1, \ldots, T'_N$. In order to compute T⁻', the following Equation (2) is solved using Newton's method.

Equation (2)

$$\sum_{i=1}^{N} \ln(T'_i (\bar{T}')^{-1})^\vee = 0 \tag{2}$$

More exactly, T⁻'$_s$ is a current approximation of the solution to Equation (2), wherein $$\xi'_{s,i} = \ln(T'_i (\bar{T}_s)^{-1})^\vee.$$

T⁻'$_{s+1}$=exp($\bar{\eta}_s$)T⁻'$_s$ is taken as the next approximation, wherein $\eta_s$ is represented by the following Equation (3).

Equation (3)

$$\eta_s = -\mathcal{J}_s^{-1} \sum_{i=1}^{N} \xi'_{s,i} \tag{3}$$

$J_s$ of Equation (3) is the Jacobian of mapping $$\eta \mapsto \sum_{i=1}^{N} \ln(\exp((\xi'_{s,i})^\wedge)\exp(-\eta^\wedge))^\vee$$

and can be computed using Equations (33) and (34) of above Reference Document 1.

Then after computing T⁻', $\Sigma$' representing the uncertainty of pose is computed according to following Equation (4).

Equation (4)

$$\sum{}' = \frac{N}{N-1} \sum_{i=1}^{N} \xi'_i (\xi'_i)^T \tag{4}$$

where $\xi'_i = \ln(T'_i (\bar{T}')^{-1})^\vee$.

Next, detailed explanation follows regarding estimation processing by the estimator 42 to estimate the pose of the target object O after each action assuming that each action has been performed. In this there is an assumption that target object O is a multi-faceted body and that a center of gravity of the multi-faceted body is known. Friction between the target object O and the gripper 56, and friction between the target object O and the support surface P will be ignored.

A point where the center of gravity of the target object O is projected onto the support surface P is called C. In Place, a position of the point C inside a support polygon does not change as friction between the target object O and the support surface P is ignored. This means that rotation of the target object O in Place can be computed simply where the target object O is disposed.

Figure 6:
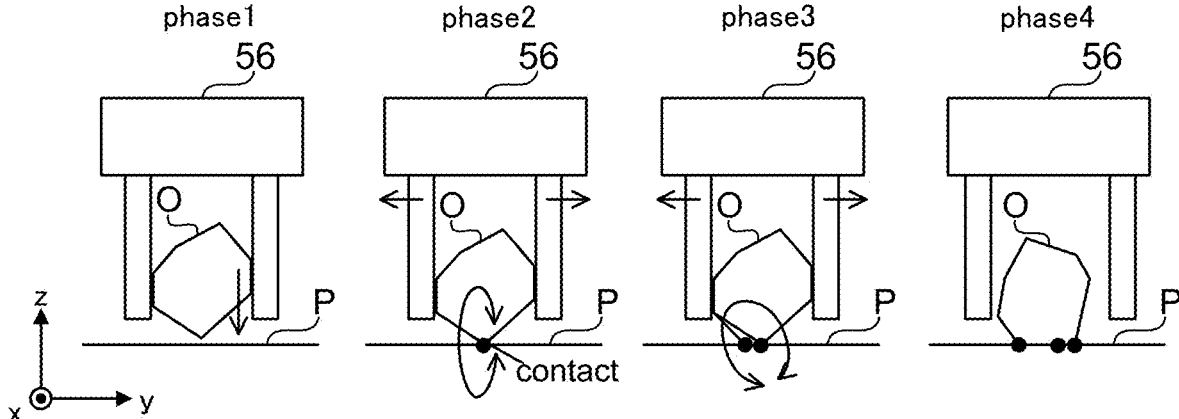
FIG. 6 is a diagram to explain an action of a gripper to place a target object.

As in the example illustrated in FIG. 6, rotation of the target object O placed on the support surface P can be broken down into 4 phases.

(1) The target object O falls vertically without rotation when none of the apex points of the target object O are on the support surface P.

(2) In cases in which only one of the apex points of the target object O is on the support surface P, the target object O rotates about a line on the support surface P orthogonal to a line connecting this apex point to point C.

(3) In cases in which two apex points of the target object O are on the support surface P and there is a line from the point C perpendicular to a line connecting the two apex points, the target object O rotates about the line connecting these two apex points.

(4) In cases in which three or more apex points of the target object O are on the support surface P, the target object O is disposed stably when the point C is at the inside of a convex hull formed by the apex points of the target object O on the support surface P. The disposed behavior is deemed unstable in other cases.

The estimator 42 computes an estimate value of the pose of the target object after Place assuming that Place has been performed according to following Equation (5) to Equation (13). The following notation is used.

x, y, z coordinates of a given point v are denoted by $v_x$, $v_y$, $v_z$.

A straight line connecting two points v and u is denoted by $\overline{vu}$

A transformation of rotation about straight line 1 by angle $\theta$ is denoted by $T_{1,\theta}$.

For $d \in \{x, y, z\}$, and two points v, u on a straight line 1 having a constant d coordinate, an angle $\theta$ such that the d coordinates of $T_{1,\theta}(v)$ and $T_{1,\theta}(u)$ are the same is denoted by $ang_{d,1}(v, u)$.

A set of start coordinates of apex points of target object O is denoted by $v_0, v_1, \ldots, v_n$.

The z coordinate of the support surface P is denoted by $z_0$.

A transformation by Place is computed in the following manner.

1)

Equation (5)

$$i_0 := \operatorname*{argmin}_i v_{i,z} \qquad (5)$$

2) A straight line on the support surface P that includes $v_{i0}$ and is orthogonal to $\overline{v_{i_0}C}$ is denoted by $1_1$.

Equation (6)

$$i_1 := \operatorname*{argmin}_{i \neq i_0} ang_{z,l_1}(v_{i_0}, v_i) \qquad (6)$$

Equation (7)

$$\theta_1 := ang_{z,l_1}(v_{i_0}, v_{i_1}) \qquad (7)$$

Equation (8)

$$v_i' := T_{l_1,\theta_1}(v_i) \qquad (8)$$

Equation (9)

$$C' := T_{l_1,\theta_1}(C) \qquad (9)$$

3) Let $$l_2 := \overline{v_{i_0}' v_{i_1}'}$$

Equation (10)

$$\theta_2 := \min_{i \notin \{i_0, i_1\}} ang_{z,l_2}(v_{i_0}', v_i') \qquad (10)$$

Equation (11)

$$v_i'' := T_{l_2,\theta_2}(v_i') \qquad (11)$$

Equation (12)

$$C'' := T_{l_2,\theta_2}(C') \qquad (12)$$

Finally, the coordinates after Place are computed according to the following Equation (13).

Equation (13)

$$v_i''' := v_i'' - \left(C_x'' - C_x, C_y'' - C_y, v_{i_0}'' - z_0\right)^T \qquad (13)$$

In Grasp, the fingers of the gripper 56 configure parts of two parallel planes orthogonal to the support surface P, and Grasp may be thought of as movement in directions normal to the two parallel planes. The x axis may be thought of as being parallel to both the support surface P and the fingers, the y axis as being orthogonal to the fingers, and the z axis as being a direction away from the support surface P. In cases in which the start pose of the target object O is near to a stable pose and the center of gravity of the target object O is not far from the fingers of the gripper 56, a change in the position of the target object O with respect to the x axis is small enough to be ignored. Moreover, a position of the y axis of the target object O is fixed by the fingers, and the position of the z axis is fixed by the support surface P. This means that in Grasp, only rotation of the target object O being grasped by the gripper 56 needs to be considered.

Figure 7:
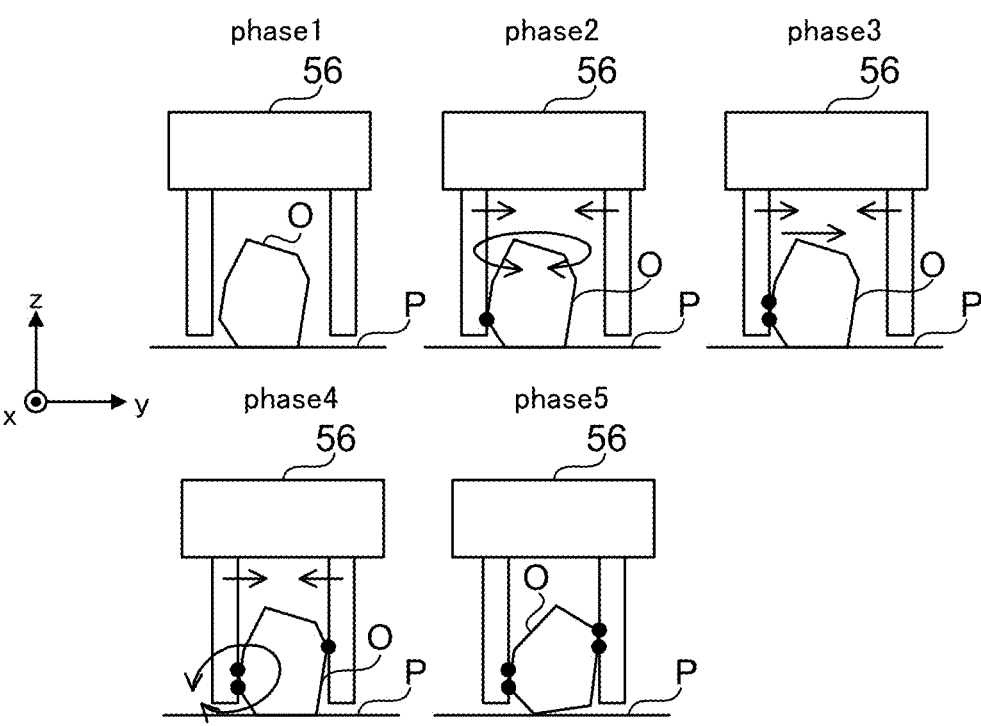
FIG. 7 is a diagram to explain an action of a gripper to grasp a target object.

In the example illustrated in FIG. 7, rotation of the target object O in Grasp is broken down into the following 5 phases according to the amount of closing of the fingers of the gripper 56.

(1) The target object O does not rotate when none of the fingers touch the target object O.

(2) The target object O rotates about the z axis when one or other of the fingers is touching one of the apex points of the target object O, or when two of the apex points are touched by respective fingers.

(3) The target object O is only pushed and does not rotate when two of the apex points of the target object O are touched by one finger, and none of the apex points of the target object O are touched by the other finger.

(4) When two of the apex points of the target object O are touched by one finger and one apex point of the target object O is touched by the other finger, the target object O rotates about a line connecting the two apex points touched by the same finger.

(5) When three or more apex points of the target object O are touched by one finger and at least one apex point of the target object O is touched by the other finger, or when two apex points of the target object O are touched by each of the fingers, the target object O may be thought of as being grasped stably as long as there is an intersection point between a convex hull of the apex points touched by one finger and a convex hull of apex points touched by the other finger. The target object O may be thought of as being grasped unstably in other circumstances.

Note that phase 3 is not necessarily passed through. Moreover, apex points having the same x coordinate and y coordinate in phase 2, phase 3, and phase 4 are considered to be a single apex point.

The estimator 42 computes an estimated value of the pose of the target object O after Grasp assuming that Grasp has been performed according to the following Equation (14) to Equation (23).

1)

Equation (14)

$$i_0 := \operatorname*{argmin}_i v_{i,y} \qquad (14)$$

Equation (15)

$$i_1 := \operatorname*{argmax}_i v_{i,y} \qquad (15)$$

2) Straight lines parallel to the z axis and including $v_{i0}$, $v_{i1}$ are denoted by $1_0$, $1_1$.

Equation (16)

$$(i_2, b) := \underset{i \notin \{i_0, i_1\}, b \in \{0,1\}}{\operatorname{argmin}} \ ang_{y,l_b}(v_{i_b}, v_i) \tag{16}$$

Equation (17)

$$\theta_2 := ang_{y,l_b}(v_{i_b}, v_{i_2}) \tag{17}$$

Equation (18)

$$v_i' := T_{l_b, \theta_1}(v_i) \tag{18}$$

Equation (19)

$$C' := T_{l_b, \theta_2}(C) \tag{19}$$

3)

$$l_3 := \overline{v_{i_b}' v_{i_2}'}$$

Equation (20)

$$\theta_3 := \underset{i \notin \{i_0, i_1, i_2\}, c \in \{0,1\}}{\min} \ ang_{y,l_2}(v_{i_c}', v_i') \tag{20}$$

Equation (21)

$$v_i'' := T_{l_3, \theta_3}(v_i') \tag{21}$$

Equation (22)

$$C'' := T_{l_3, \theta_3}(C') \tag{22}$$

Finally, the coordinates after Place are computed according to following Equation (23). In Equation (23) $g_y$ denotes the y coordinate of the gripper 56.

Equation (23)

$$v_i''' := v_i'' - \left(C_x'' - C_x, \frac{v_{i_0,y}'' + v_{i_1,y}''}{2} - g_y, \underset{i}{\min} v_{i,z}'' - z_0\right)^T \tag{23}$$

The same coordinates to those in Grasp are employed in Push. The target object O is pushed in the x axis direction in Push. The same reasoning is applicable to Push as the reasoning in Grasp, and only rotation of the target object O needs to be computed.

Figure 8:
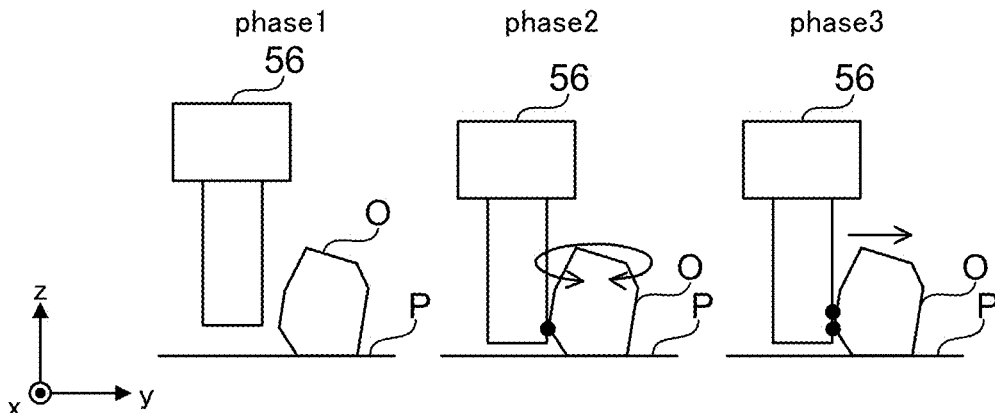
FIG. 8 is a diagram to explain an action of a gripper to push a target object.

As illustrated in the example of FIG. 8, rotation of the target object O in Push is broken down into three phases.

(1) The target object O does not rotate when the fingers of the gripper 56 do not touch the target object O.

(2) The target object O rotates about the z axis when any apex point of the target object O is touched by a finger.

(3) The target object O is only pushed and does not rotate when two of the apex points of the target object O are touched by a finger.

Note that apex points having the same x coordinate and y coordinate are considered to be a single apex point.

The estimator 42 computes the estimated value of the pose of the target object O after Push assuming that Push has been performed according to the following Equation (24) to Equation (28).

1)

Equation (24)

$$i_0 := \underset{i}{\operatorname{argmin}} v_{i,x} \tag{24}$$

2) A straight line parallel to the z axis including $v_{i0}$ is denoted $1_1$.

Equation (25)

$$\theta_1 := \underset{i \neq i_0}{\min} ang_{x,l_1}(v_{i_0}, v_i) \tag{25}$$

Equation (26)

$$v_i' := T_{l_1, \theta_1}(v_i) \tag{26}$$

Equation (27)

$$C' := T_{l_1, \theta_1}(C) \tag{27}$$

Finally, the coordinates after Push are computed according to the following Equation (28). In Equation (28) $g_x$ is the x coordinate of the gripper 56, and $w_x$ is the width of the fingers of the gripper 56.

Equation (28)

$$v_i'' := v_i' - \left(v_{i_0}' - g_x - \frac{w_x}{2}, C_y' - C_y, 0\right)^T \tag{28}$$

The estimator 42 quantifies the uncertainty of pose as a scaler for the generator 40 to select a single action series from out of plural candidate action series. The following Equation (29) is employed as a substitute for Equation (1) in this quantification.

Equation (29)

$$T = \overline{T}\exp(\xi^{i\wedge}) \tag{29}$$

The covariance matrix of $\xi'$ is denoted by $\Sigma'$. Conversion from $\Sigma$ to $\Sigma'$ can be computed using Equation (26) that is a coordinate change equation of above Reference Document 1. The estimator 42 computes a score representing the uncertainty of pose according to the following Equation (30). $c_{i,j}$ is a fixity factor in Equation (30).

Equation (30)

$$\operatorname{score}(\overline{T}, \Sigma) = \sum_{i=1}^{6} \sum_{j=1}^{6} c_{i,j} \Sigma_{i,j}' \tag{30}$$

The reason for converting $\Sigma$ to $\Sigma'$ is because $\Sigma'$ is related to the coordinate system of the target object O itself. The first three diagonal components of $\Sigma'$ correspond to the uncertainty in the position of the target object O in x, y, and z, and the second three diagonal components thereof correspond to the uncertainty of pose of the target object O. The off-diagonal components of $\Sigma'$ correspond to covariance therebetween.

A number of target objects O have rotational symmetry about an axis, and this makes it difficult to eliminate uncertainty about this axis. This unavoidable uncertainty is ignored in such circumstances, and coefficient $c_{i,j}$ is set so as to minimize the remainder.

The discharger 44 outputs the action series selected by the generator 40 to the controller 50. The controller 50 generates command values based on the action series input from the generation device 10, and outputs the command values to the robot 52. The robot 52 is driven according to the command values input from the controller 50 and performs positioning of the target object O.

Figure 9:
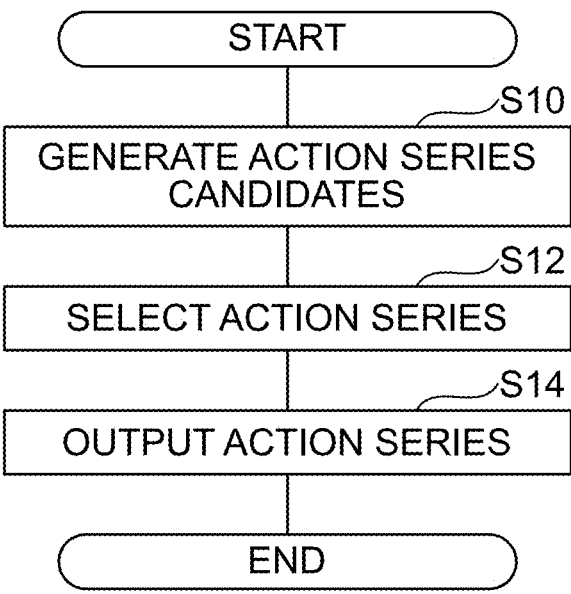
FIG. 9 is a flowchart illustrating an example of action series generation processing.

Next, description follows regarding operation and advantageous effects of the generation device 10, with reference to FIG. 9. The action series generation processing illustrated in FIG. 9 is executed by the CPU 12 executing the generation program 30. The action series generation processing illustrated in FIG. 9 is executed, for example, when an instruction to start execution has been input by a user.

At step S10 of FIG. 9, the generator 40 generates plural different candidates of an action series by breadth-first search as described above. As described above, the estimator 42 estimates for each of the steps of this breadth-first search both the pose of the target object O and the uncertainty of pose after action assuming that the action of the step has been performed.

At step S12, the generator 40 generates an action series by selecting an action series from out of the plural candidate action series generated at step S10 so as to minimize a final value of the score representing the uncertainty of pose. At step S14, the discharger 44 outputs the action series selected at step S12 to the controller 50.

The action series generation processing is complete when the processing of step S14 finishes. The robot 52 is driven according to the command values input from the controller 50 at step S14 and performs positioning of the target object O.

Thus as described above, the present exemplary embodiment positions the target object O using the three actions Grasp, Place, and Push. The positioning of pose of diverse target objects O can accordingly be performed with good accuracy. Moreover, the positioning of the pose of the target object O can be performed with good accuracy without using specialized tools.

Note that the action series generation processing executed by the CPU reading software (a program) in the above exemplary embodiment may be executed by various processors other than a CPU. Examples of such processors include programmable logic devices (PLD) that allow circuit configuration to be modified post-manufacture, such as a field-programmable gate arrays (FPGA), and dedicated electric circuits, these being processors including a circuit configuration custom-designed to execute specific processing, such as an application specific integrated circuit (ASIC). Moreover, the action series generation processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although an embodiment has been described in the above exemplary embodiment in which the generation program 30 is pre-stored (installed) on the storage device 16, there is no limitation thereto. The generation program 30 may be provided in a format recorded on a non-transitory recording medium such as on a compact disc read only memory (CD-ROM), a digital versatile disc read only memory (DVD-ROM), a universal serial bus (USB)

memory, or the like. The generation program 30 may also be provided in a format downloadable from an external device over a network.

The present disclosure provides a generation device, a generation method, and a recording medium recorded with a generation program that enable the pose of diverse target objects to be positioned with good accuracy.

A generation device according to the present disclosure includes a generator that generates an action series for performing positioning on a target object, wherein the action series includes two or more combinations of at least one action from out of a first action to grasp the target object using a gripper of a robot, a second action to place the target object grasped by the gripper on a support surface, or a third action to push the target object with the gripper.

A generation method according to the present disclosure is processing executed by a computer and including generating an action series for performing positioning on a target object the action series includes two or more combinations of at least one action from out of a first action to grasp the target object using a gripper of a robot, a second action to place the target object grasped by the gripper on a support surface, or a third action to push the target object with the gripper.

A generation program recorded on a recording medium recorded according to the present disclosure causes a computer to function as a generator that generates an action series for performing positioning on a target object, wherein the action series includes two or more combinations of at least one action from out of a first action to grasp the target object using a gripper of a robot, a second action to place the target object grasped by the gripper on a support surface, or a third action to push the target object with the gripper.

The present disclosure thereby enables a pose (posture) of diverse target objects to be positioned with good accuracy.

What is claimed is:

1. A generation device, comprising:

a memory, and a processor coupled to the memory, the processor being configured to generate an action series for performing positioning on a target object, the action series including two or more combinations of at least one of a first action of grasping the target object using a gripper of a robot, a second action of placing the target object grasped by the gripper on a support surface, or a third action of pushing the target object with the gripper;

estimate a posture of the target object and a degree of uncertainty of posture of the target object after each action in a case in which each action included in a candidate of the action series is assumed to have been performed; and generate an action series to reduce the estimated degree of uncertainty of posture sequentially as each action is performed.

2. The generation device of claim 1, wherein the processor is further configured to input a generated action series to the robot.

3. The generation device of claim 1, wherein the processor is further configured to:

compute a score representing the degree of uncertainty; and generate an action series by selecting an action series from a plurality of different candidate action series so as to minimize a final value of the score.

4. The generation device of claim 1, wherein a condition of the third action is that a perpendicular line, drawn from a center of gravity of the target object perpendicular to a line segment or plane connecting two or more points at which the gripper contacts the target object, is positioned inside the line segment or inside the plane.

5. The generation device of claim 1, wherein, in a case in which two or more instances of a same action are included in a single action series, the processor is configured to set different action conditions for respective instances of the same action.

6. A generation method, comprising:

by a processor, generating an action series for performing positioning on a target object, the action series including two or more combinations of at least one of a first action of grasping the target object using a gripper of a robot, a second action of placing the target object grasped by the gripper on a support surface, or a third action of pushing the target object with the gripper;

estimating a posture of the target object and a degree of uncertainty of posture of the target object after each action in a case in which each action included in a candidate of the action series is assumed to have been performed; and generating an action series to reduce the estimated degree of uncertainty of posture sequentially as each action is performed.

7. The generation method of claim 6, wherein the method further comprises inputting a generated action series to the robot.

8. The generation method of claim 6, wherein the method further comprises:

computing a score representing the degree of uncertainty; and generating an action series by selecting an action series from a plurality of different candidate action series so as to minimize a final value of the score.

9. A non-transitory recording medium storing a generation program executable by a computer to perform processing comprising:

generating an action series for performing positioning on a target object, the action series including two or more combinations of at least one of a first action of grasping the target object using a gripper of a robot, a second action of placing the target object grasped by the gripper on a support surface, or a third action of pushing the target object with the gripper;

estimating a posture of the target object and a degree of uncertainty of posture of the target object after each action in a case in which each action included in a candidate of the action series is assumed to have been performed; and generating an action series to reduce the estimated degree of uncertainty of posture sequentially as each action is performed.

* * * * *